US006540093B1

(12) United States Patent
Shumway

(10) Patent No.: US 6,540,093 B1
(45) Date of Patent: Apr. 1, 2003

(54) WINDOW SHELF SYSTEM

(76) Inventor: Cindy A. Shumway, 2052 Hwy. 68, Ottawa, KS (US) 66067

( * ) Notice: Subject to any disclaimer, the term of this patent is extended or adjusted under 35 U.S.C. 154(b) by 0 days.

(21) Appl. No.: 09/990,523

(22) Filed: Nov. 21, 2001

(51) Int. Cl.[7] .................................................. A47F 5/08
(52) U.S. Cl. ............... 211/90.02; 211/103; 108/147.11; 108/147.17
(58) Field of Search ............................ 211/90.01, 90.02, 211/103, 187; 248/243; 108/147.11, 147.17

(56) References Cited

U.S. PATENT DOCUMENTS

| | | | | |
|---|---|---|---|---|
| 200,767 | A | * | 2/1878 | Sanderson |
| 845,917 | A | * | 3/1907 | Worley et al. |
| 1,009,679 | A | * | 11/1911 | McFadden |
| 1,704,937 | A | * | 3/1929 | Davis |
| 3,645,486 | A | * | 2/1972 | Ferdinand et al. .......... 248/243 |
| 4,138,019 | A | * | 2/1979 | Smith ...................... 211/87.01 |
| 4,188,891 | A | | 2/1980 | Boyajian |
| 4,195,577 | A | | 4/1980 | Gross |
| 4,653,712 | A | | 3/1987 | Murray et al. |
| D295,478 | S | | 5/1988 | Helmholdt et al. |
| 4,746,021 | A | | 5/1988 | Helmholdt et al. |
| 4,958,594 | A | * | 9/1990 | Swagerty ................ 211/103 X |
| 5,020,756 | A | | 6/1991 | Bauer |
| 5,201,120 | A | | 4/1993 | Patrick |
| 5,332,108 | A | * | 7/1994 | Blass ..................... 211/103 X |
| 5,794,385 | A | | 8/1998 | Donovan |
| 5,894,940 | A | * | 4/1999 | Gusdorf et al. ......... 211/103 X |
| 5,988,576 | A | * | 11/1999 | Ehrlich ................ 211/88.01 X |
| 6,179,136 | B1 | * | 1/2001 | Kluge et al. ............. 211/90.01 |

* cited by examiner

*Primary Examiner*—Robert W. Gibson, Jr.

(57) ABSTRACT

A window shelf system includes a pair of elongate shelf mounting tracks, each track defining a plurality of notches. An upper support arm is attached to the back side of each track adjacent a top thereof, each upper support arm having a downwardly extending flange for insertion between an upper trim molding segment and a wall such that the mounting tracks may be hung from the trim typically mounted to a wall above a window. Shelf support arms releasably mate with the notches for selectably determining a height for supporting a shelf board thereon. Length-adjustable lower support arms are attached to back sides of respective tracks adjacent a bottom thereof for displacing lower ends of the tracks from the wall. Each mounting track includes a telescopic support leg which may be extended to support the weight of the system and articles placed on the shelf board.

13 Claims, 6 Drawing Sheets

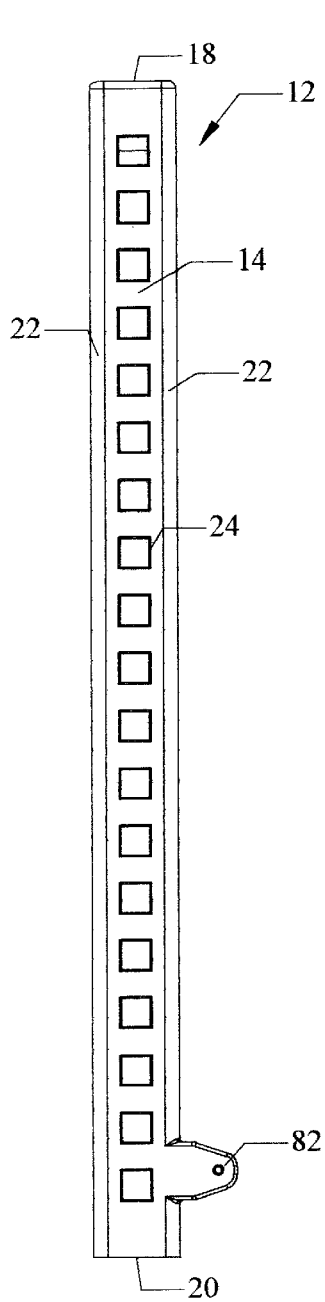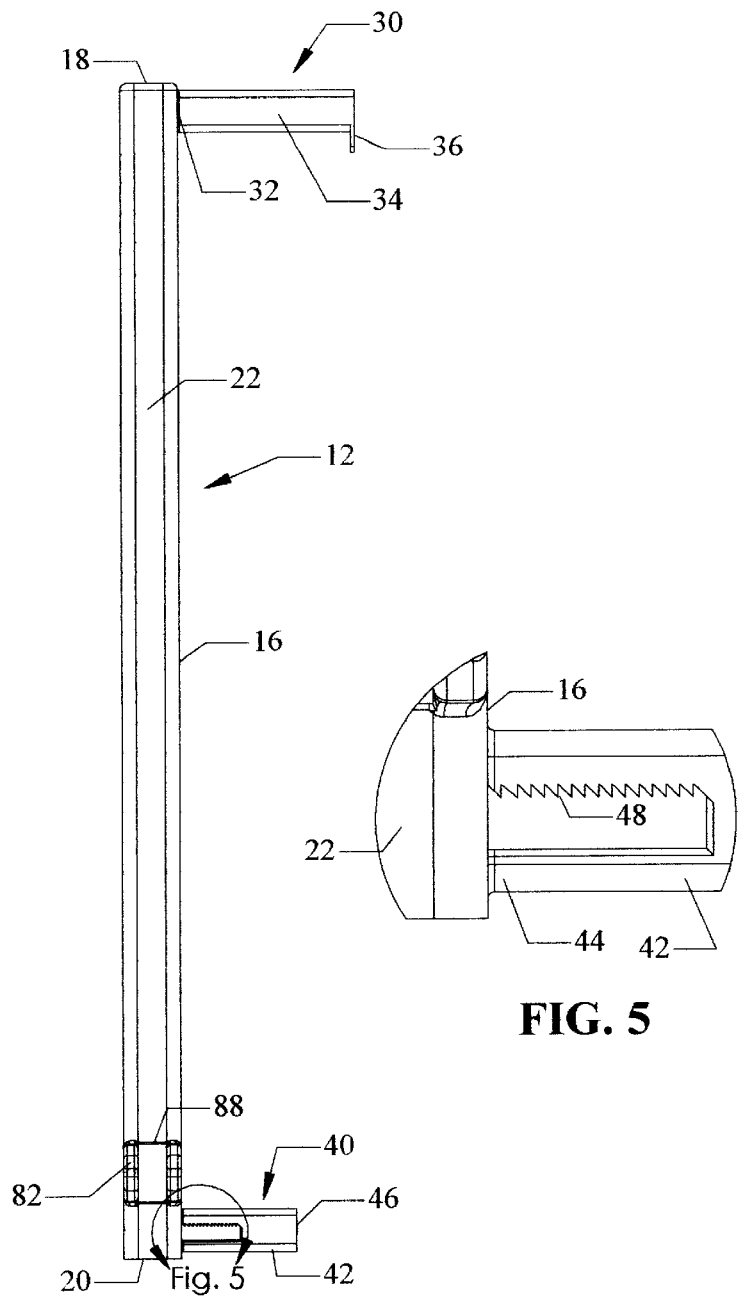
FIG. 3
FIG. 4
FIG. 5

WINDOW SHELF SYSTEM

BACKGROUND OF THE INVENTION

This invention relates generally to shelf systems and, more particularly, to a shelf system for releasable attachment to trim molding surrounding a window and which includes vertical and horizontal adjustable supports.

Potted plants kept within a house or business must be strategically positioned to receive sufficient exposure to sunlight. Although plants are traditionally supported upon window sills or tables, such supporting fixtures are often insufficient to accommodate numerous plants or the many dimensions of pots and containers.

Various devices have been proposed for providing shelving in close proximity to windows. Although assumably effective for their intended purposes, such devices require the use of fasteners which damage the window, its frame, or surrounding wall structures while other devices are bulky and inconvenient to use or move.

Therefore, it is desirable to have a shelf system that is mountable to trim molding surrounding a window frame without causing damage thereto or requiring tools or hardware. Further, it is desirable to have a shelf system which can adjustably displace mounting tracks a selected distance from a wall surface. Additionally, it is desirable to have a shelf system which includes telescopic legs for selectably providing additional support for articles resting on the shelf.

SUMMARY OF THE INVENTION

A window shelf system according to the present invention includes a pair of elongate mounting tracks, each mounting track including front and back walls and with side walls intermediate the front and back walls. The front and back walls of each mounting track define a plurality of corresponding notches that are spaced apart longitudinally between the top and bottom thereof. A generally L-shaped upper support arm is attached to the back side of each mounting track adjacent respective tops and extends normally rearwardly therefrom. The free end of each upper support arm includes an offset flange that is configured for insertion between an upper segment of trim molding surrounding a window frame and a wall to which the trim is mounted. Therefore, each mounting track may be hung from the upper trim molding by a respective upper support arm.

The shelf system includes at least a pair of shelf support arms, each arm having a first end that may be releasably coupled within selected corresponding notches. Each arm further includes a flat upper surface for supporting a shelf board or other conventional shelving.

A length-adjustable lower support arm is attached to the back side of each mounting track adjacent its respective bottom. Each lower support arm includes a first arm element and a second arm element slidably received in the first arm element. A teeth and pawl configuration enables the lower support arm to be adjusted to a selected length for selectably displacing the bottom of a mounting track away from the wall. Further, a length-adjustable leg is housed within each mounting track. Each leg may be slidably retracted within a respective mounting track or extended so as to support the shelf system and articles being supported upon a shelf board.

Therefore, a general object of this invention is to provide a shelf system which may be hung from the trim molding above a window so that shelving may be positioned near the window.

Another object of this invention is to provide a shelf system, as aforesaid, that requires no tools or hardware for installation or removal.

Still another object of this invention is to provide a shelf system, as aforesaid, having telescopic support legs.

Yet another object of this invention is to provide a shelf system, as aforesaid, in which multiple shelves may be positioned at selected heights along a pair of shelf mounting tracks.

A further object of this invention is to provide a shelf system, as aforesaid, having length-adjustable support arms which displace the mounting tracks from an adjacent wall.

A still further object of this invention is to provide a shelf system, as aforesaid, that is conveniently portable between windows.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3 is a front view of a shelf mounting track of the window shelf system as in FIG. 1;

FIG. 4 is a side view of the shelf mounting track as in FIG. 3;

FIG. 5 is a isolated view on an enlarged scale of a lower support arm as in FIG. 4;

DESCRIPTION OF THE PREFERRED EMBODIMENT

Figure 1:
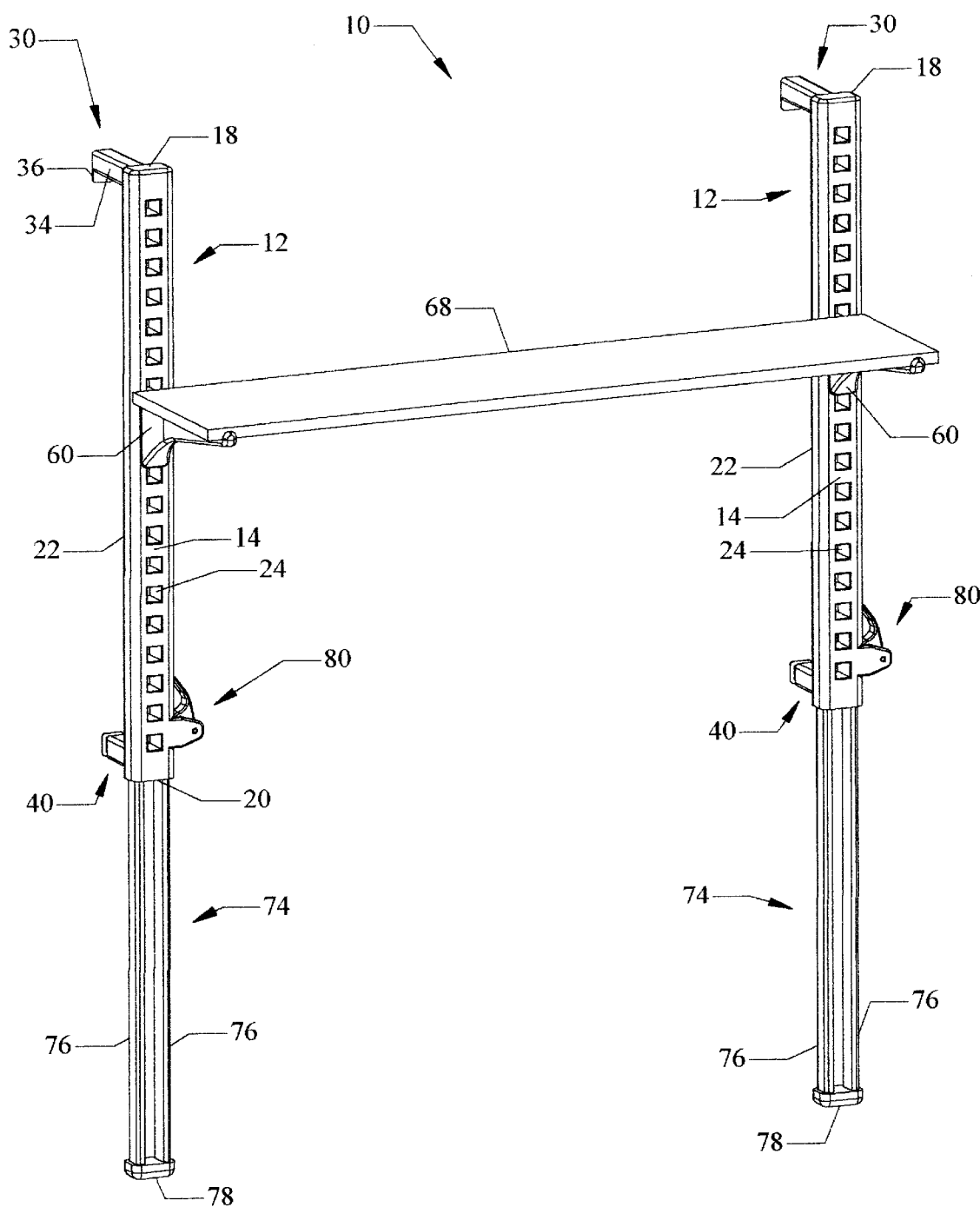
FIG. 1 is a perspective view of a window shelf system according to a preferred embodiment of the present invention, with the support legs in an extended configuration.

A window shelf system 10 according to a preferred embodiment of the present invention will now be described in detail with reference to FIGS. 1 through 7 of the accompanying drawings, identical parts being referred to with identical reference numerals. The window shelf system 10 includes a pair of elongate shelf mounting tracks 12 (FIG. 1). Each track 12 includes front 14 and back 16 walls extending longitudinally between top 18 and bottom 20 ends with side walls 22 extending between the front 14 and back 16 walls. Each mounting track 12 defines corresponding notches/apertures 24 that are spaced apart longitudinally between respective top 18 and bottom 20 ends, each notch extending completely between and through the front 14 and back 16 walls. Each shelf mounting track 12 further defines parallel channels 26 extending longitudinally along the inner surface of each side wall 22 for guiding guide rails 76 of a support leg 74 therealong (FIG. 7), as to be described more fully later. It is understood that each notch 24 extends transversely between the parallel channels 26 and that the notches 24 do not communicate with the channels 26. It should also be appreciated that each shelf mounting track 12 presents a generally solid construction except with regard to the notches 24 and channels 26 as described above.

The window shelf system 10 further includes a pair of upper support arms 30. Each upper support arm 30 includes a first end 32 fixedly attached to a back wall 16 of a respective mounting track 12 adjacent a top end 18 thereof (FIG. 3). Each upper support arm 30 includes a middle portion 34 which extends rearwardly from a respective back wall 16 and normal to the respective mounting track 12. A flange/plate 36 is fixedly attached to a free end of each upper support arm 30 in a downwardly offset configuration, the flange/plate 36 adapted to be inserted between trim molding and a wall for installation purposes, as to be described more fully later. Preferably, the middle portion 34 of each upper support arm 30 presents a sufficient length such that a respective mounting track is displaced from the wall when installed.

Figure 7:
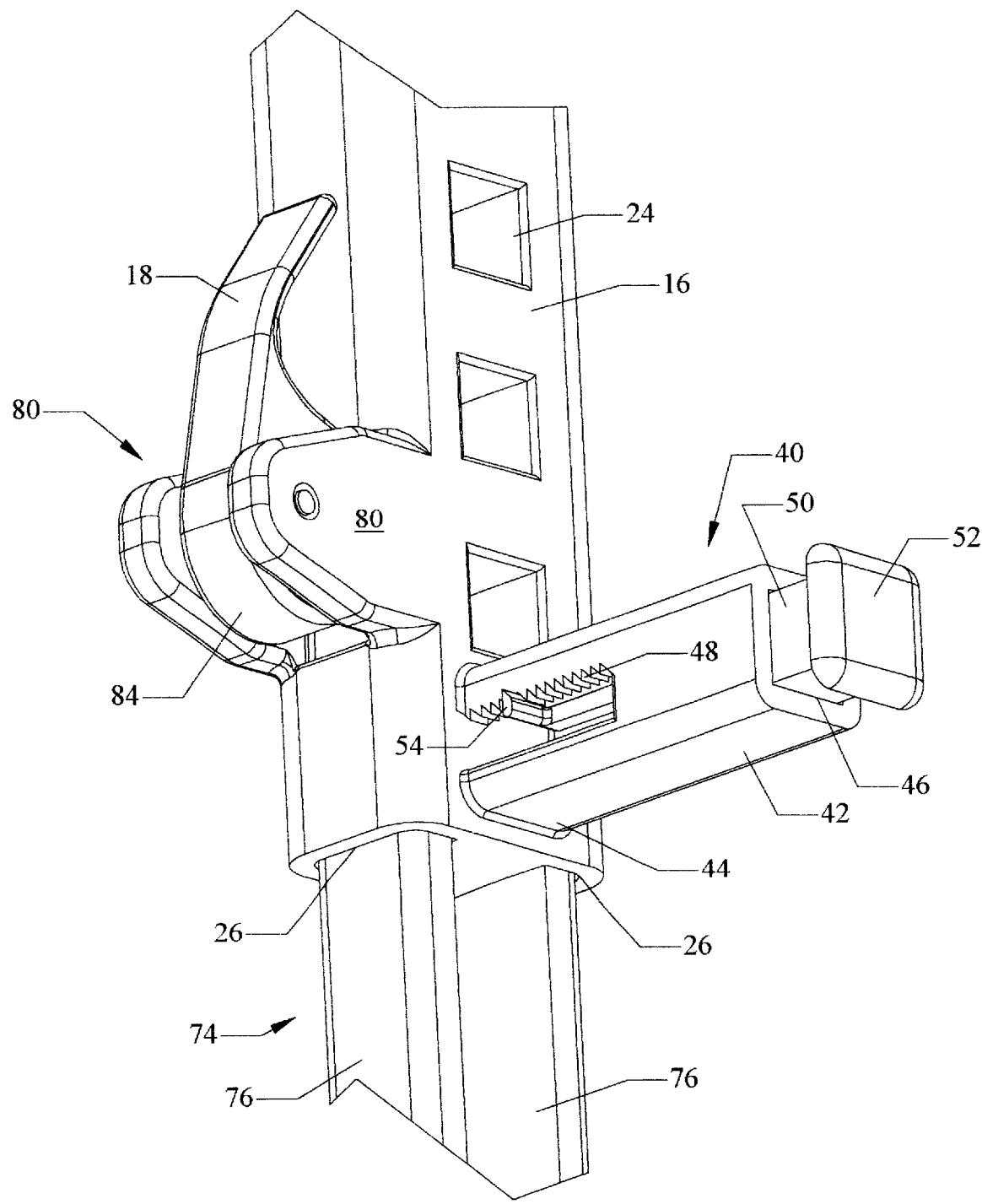
FIG. 7 is a fragmentary view on an enlarged scale of a shelf mounting track and respective support leg and cam lock assembly as in FIG. 1.

Similarly, the window shelf system 10 includes a pair of length-adjustable lower support arms 40. Each lower support arm 40 includes a hollow first arm element 42 having one end 44 fixedly attached to a back wall 16 of a respective shelf mounting track 12, extending normally relative thereto, and defining an open free end 46 (FIGS. 3 and 7). The first arm element 42 defines an imaginary longitudinal axis and essentially forms a sleeve. Each lower support arm 40 further includes a second arm element 50 that is slidably received in the first arm element 42 for telescopic movement along the imaginary longitudinal axis. A rubber foot 52 is fixedly attached to an end of the second arm element 50 for minimizing damage to a wall during use. The first arm element 42 interiorly defines a plurality of teeth 48 and the second arm element 50 includes a pawl 54 for selectively meshing with the teeth 48 such that the second arm element 50 may be selectively positioned and thus each lower support arm is length adjustable. The portion of the second arm element having a pawl 54 is flexible such that a user may disengage the pawl 54 from the teeth 48 by applying a small amount of finger pressure so as to adjust the length. The portion having a pawl 54 may alternatively be a spring clip. Alternatively, the first arm element may define a plurality of spaced apart apertures and the second arm element may include a tab/flange for mating with a selected aperture, whereby to accomplish a length adjustment.

The window shelf system 10 further includes at least a pair of shelf support arms 60. Each shelf support arm 60 includes a first end 62 having a configuration complementary to that of the notches/apertures 24 such that it may be inserted into a selected notch/aperture 24 (FIG. 5). A spring clip 64 is attached to the tip of each first end 62 such that a respective shelf support arm 60 is snappably secured to a mounting track 12 when the first end 62 is completely inserted through a selected notch/aperture 24. The spring clip 64 may be depressed by a user to release the shelf support arm 60. Of course, a resilient flange other than a spring clip would also be suitable. Each shelf support arm 60 further includes an elongate portion having a flat upper surface 66 adapted to support a shelf board 68 thereon. Each shelf support arm 60 also includes a second end 70 opposite the first end 62 to which a stop 72 is fixedly attached. Therefore, a shelf board 68 or other similar shelving may be positioned and held atop a pair of shelf support arms 60 positioned in corresponding notches 24 of the pair of shelf mounting tracks 12. Obviously, numerous shelf support arms 60 may be positioned along the shelf mounting tracks 12 such that multiple shelf boards 68 may be utilized simultaneously.

The window shelf system 10 further includes a pair of elongate leg members 74 that are telescopically receivable in respective shelf mounting tracks 12 (FIG. 1). Each leg member 74 includes a pair of spaced apart guide rails 76 configured to mate with and slide along corresponding channels 26 within a shelf mounting track 12 (FIG. 7). Thus, the rails 76 slidably move along either side of the notches 24. The free bottom end of each leg member 74 includes a rubber foot 78.

Figure 8:
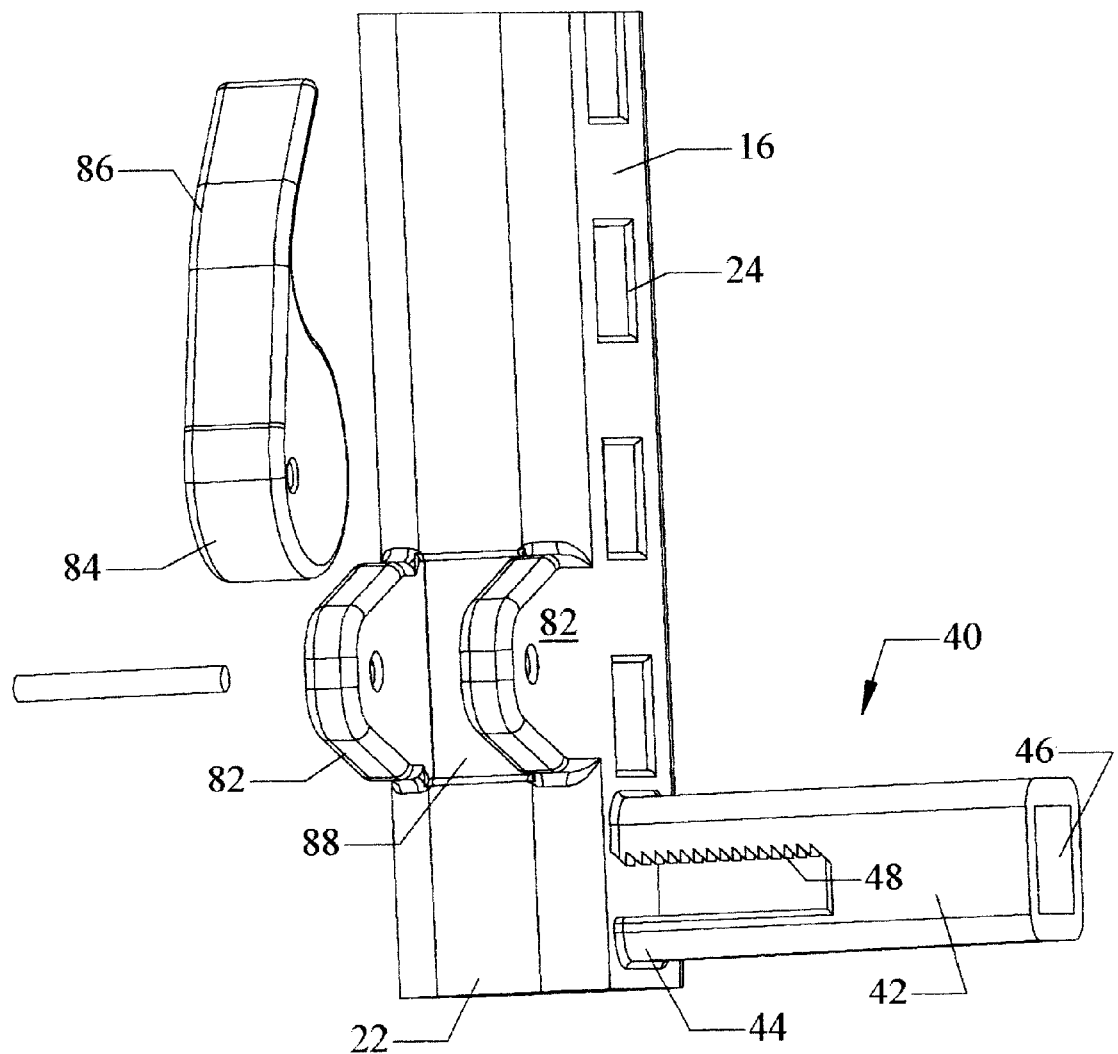
FIG. 8 is an exploded view of the cam lock assembly as in FIG. 7.

A cam lock assembly 80 is mounted to a side wall 22 of each shelf mounting track 12 adjacent a respective bottom end 20. Obviously, a cam lock assembly 80 can be mounted to either side wall 22. Each cam lock assembly 80 includes a bracket 82 fixedly attached to a side wall 22 to which a cam lock 84 is pivotally coupled (FIG. 7). A lever 86 is integrally attached to the cam lock 84 for enabling a user to rotate the cam lock 84 between first and second configuration. The cam lock 84 is formed such that in a first configuration it extends through a cut-out 88 in the side wall 22 and bears against a guide rail 76 of a respective leg member 74 whereby to prevent its movement in a friction-fit relationship. Using the lever 86, a user may rotate the cam lock 84 to a second configuration in which the leg member 74 is released for movement along the channels 26 of a respective shelf mounting track 12. The configuration of the cam lock 84 is best shown in FIG. 8.

Figure 2:
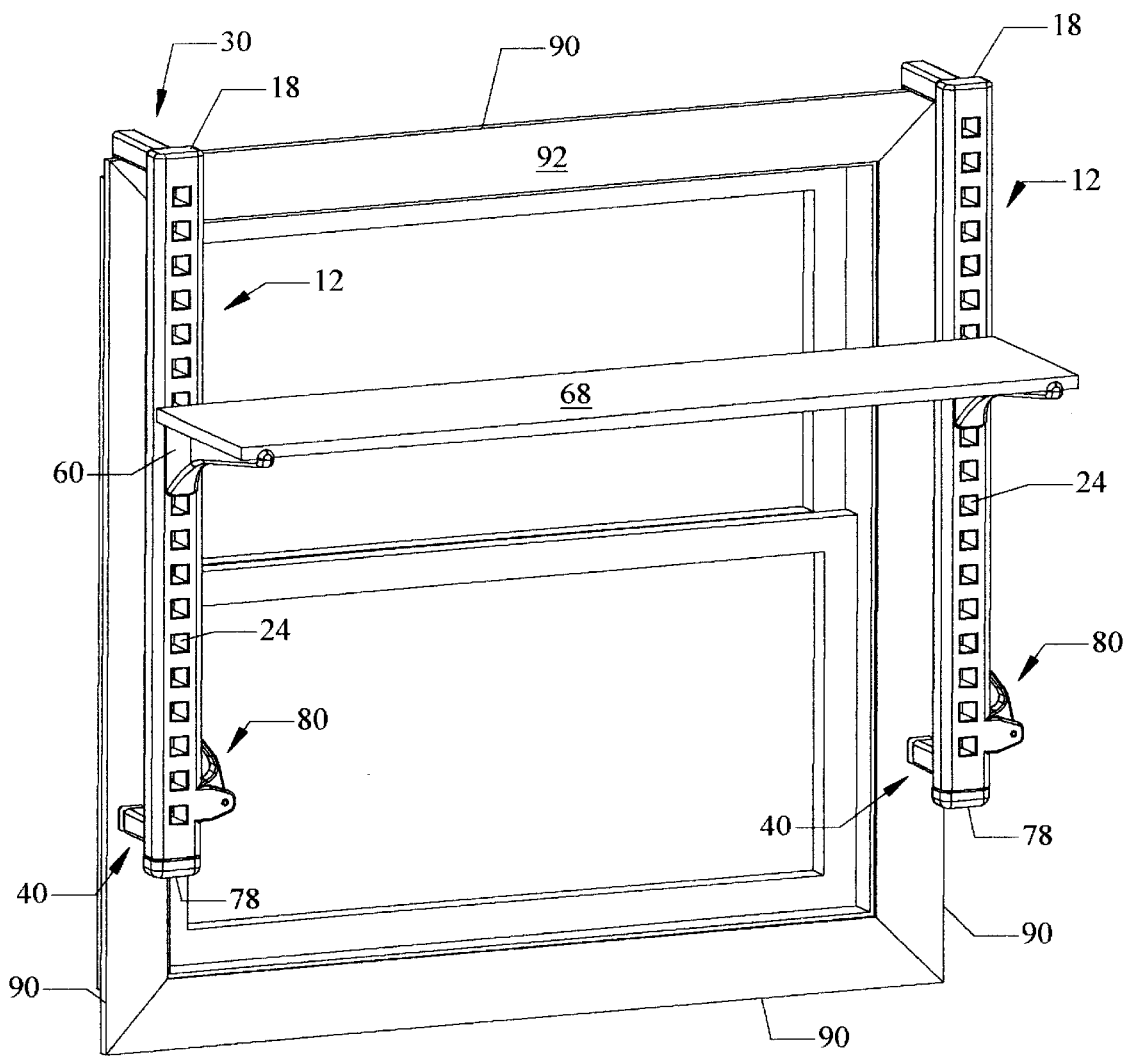
FIG. 2 is a perspective view of the window shelf system as in FIG. 1 with the support legs in a retracted configuration and installed over a window.
Figure 6:
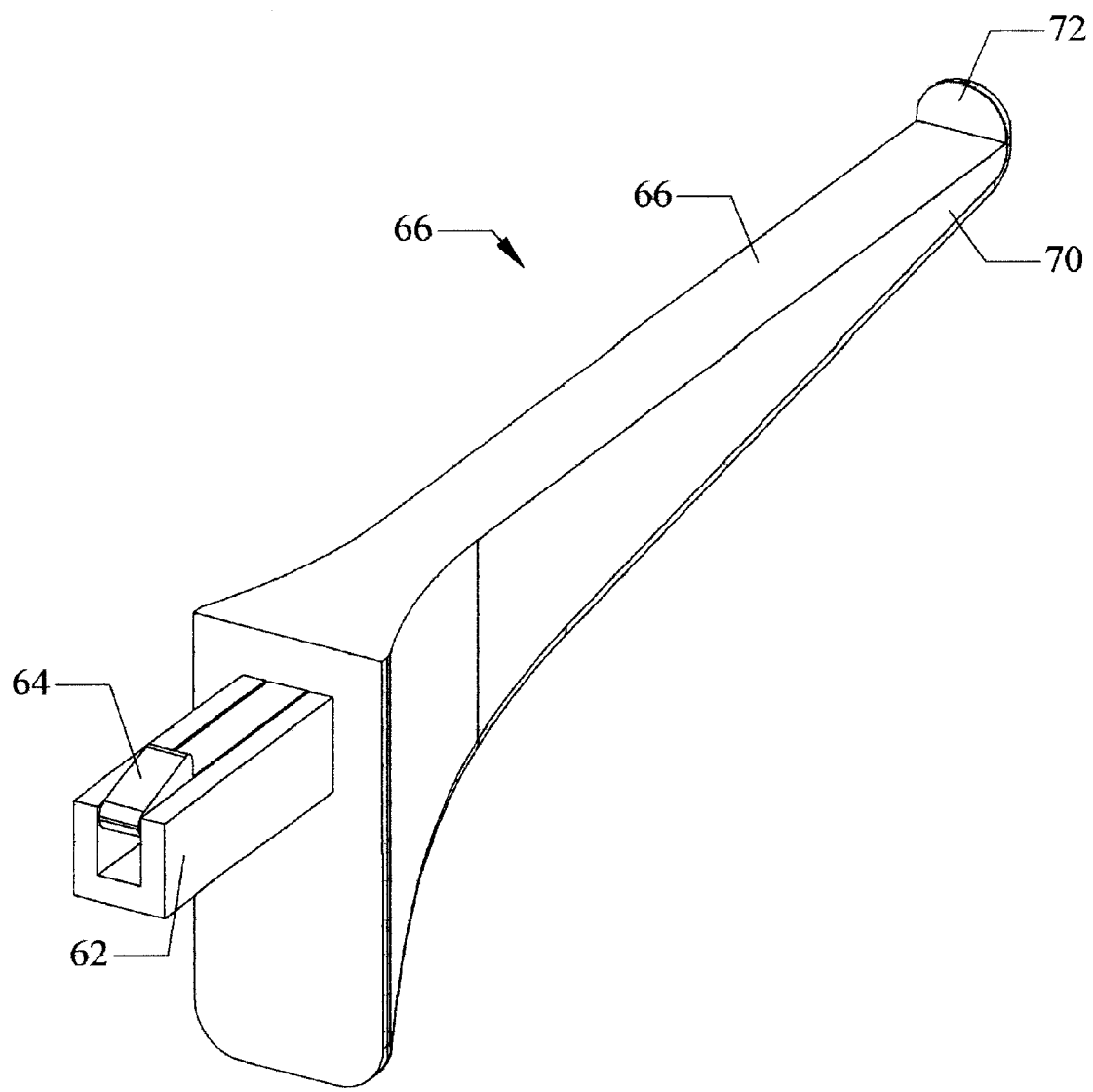
FIG. 6 is a perspective view of a shelf support arm removed from the shelf mounting track as in FIG. 1.

In use, each shelf mounting track 12 may be positioned relative to the window of a house, garage, or business structure such that the flange/plate 36 of an upper support arm 30 may be inserted between an upper segment 92 of trim molding 92 and a wall (FIG. 2). Thus, each mounting track 12 may be hung from wood trim molding 92 that is customarily attached to a wall to surround a window. The length of the upper support arms 30 causes each mounting track 12 to be displaced from the wall such that they hang in a completely vertical configuration. The lower support arms 40 similarly displace the bottom ends of the mounting tracks 12 from the wall. The lower support arms 40 may be selectively length-adjusted by a user using the pawl 54 and teeth 48 configuration of the second 50 and first 42 lower support arm elements, respectively. At least a pair of shelf support arms 60 may be inserted into selected corresponding notches/apertures 24 and snappably secured therein. A shelf board 68 or other shelving may then be rested atop corresponding shelf support arms 60 for supporting plants or other articles thereon. If needed, the leg members 74 may be extended to the floor for additional support. The cam lock assembly 80 may be used to releasably lock the leg members 74 at a desired length.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A shelf system for installation on an upper segment of trim molding of the type mounted to a wall surrounding a window, said shelf system, comprising:

a pair of elongate shelf mounting tracks, each shelf mounting track having first and second ends, each shelf mounting track defining a plurality of notches spaced apart longitudinally between said first and second ends;

a pair of L-shaped flanges, each L-shaped flange having a first end fixedly attached to a respective first end of a respective shelf mounting track and having a second end for selective insertion behind said upper segment of said trim molding, whereby to releasably couple said respective shelf mounting track to said upper segment;

a pair of shelf support arms, each shelf support arm having a first end adapted to releasably mate with a selected notch and having a flat upper surface adapted to support a shelf board thereon;

a pair of leg members, each leg member being telescopically received in a respective shelf mounting track through said bottom thereof; and means for positioning each leg member at a selected longitudinal position in said respective shelf mounting track.

2. The shelf system as in claim 1 wherein each L-shaped flange includes a middle portion extending longitudinally between said first and second ends thereof, said middle portion being normal to said respective shelf mounting track and having a length such that said respective shelf mounting track is displaced from said upper segment of said trim molding when said second end of said L-shaped flange is inserted behind said upper segment.

3. The shelf system as in claim 1 wherein each first end of said pair of shelf support arms includes a spring clip adapted to releasably engage a respective notch of a respective shelf mounting track, whereby to selectably position said pair of shelf support arms along said pair of shelf mounting tracks.

4. The shelf system as in claim 1 further comprising:

a pair of length-adjustable lower support arms, each lower support arm including a first arm element fixedly attached to a respective shelf mounting track adjacent a respective second end thereof, each lower support arm including a second arm element telescopically received in said first arm element; and means for positioning a respective second arm element at a selected position in a respective first arm element, whereby said respective second end of said respective shelf mounting track is displaced a selectable distance from a wall.

5. The shelf system as in claim 1 further comprising a stop member fixedly attached to a second end of each shelf support arm, said stop member adapted to position said shelf board upon said upper surface.

6. A window shelf system for installation on an upper segment of trim molding of the type mounted to a wall surrounding a window, said shelf system comprising:

a pair of elongate shelf mounting tracks, each shelf mounting track having a top and a bottom with front and back walls extending longitudinally therebetween and having side walls intermediate said front and back walls, said front and back walls defining a plurality of notches spaced apart longitudinally between said top and bottom with each notch extending between said front and back walls;

a pair of upper support arms, each upper support arm having a first end fixedly attached to a respective back wall of a respective shelf mounting track adjacent a respective top thereof and each upper support arm having a second end opposite said first end;

a pair of mounting flanges, each mounting flange being fixedly attached to respective second ends of respective upper support arms and being offset for selective insertion between said upper segment of said trim molding and said wall, whereby to support said respective shelf mounting track therefrom;

a pair of shelf support arms, each shelf support arm having a first end adapted to releasably mate with selected corresponding notches and having a flat upper surface adapted to support a shelf board thereon; and a pair of length-adjustable lower support arms, each lower support arm including a first arm element fixedly attached to a respective back wall of a respective shelf mounting track adjacent a respective bottom end thereof and defining a longitudinal axis, each lower support arm including a second arm element telescopically received in said first arm element and movable along said longitudinal axis for adjusting the length of said lower support arm, whereby to displace said respective shelf mounting track from the wall.

7. The window shelf system as in claim 6 wherein:

each first arm element of a respective lower support arm includes a plurality of teeth; and each second arm element of said respective lower support arm includes a pawl for selectively meshing with said plurality of teeth, whereby respective first and second arm elements may be positioned at a user-selected length configuration.

8. The window shelf system as in claim 6 further comprising:

a pair of leg members, each leg member being telescopically received in a respective shelf mounting track through said bottom thereof; and means for positioning each leg member at a selected position in said respective shelf mounting track.

9. The window shelf system as in claim 8 wherein said positioning means includes a cam lock pivotally coupled to a respective side wall of a respective shelf mounting track, said cam lock being selectively pivotal between a first configuration extending through said respective side wall and bearing against a respective leg member so as to hold said respective leg member and a second configuration displaced from said respective leg member so as to release said respective leg member.

10. The window shelf system as in claim 6 further comprising a stop member fixedly attached to a second end of each shelf support arm, said stop member adapted to hold said shelf board upon said flat upper surface thereof.

11. The window shelf system as in claim 8 further comprising a pair of foot members connected to free ends of respective leg members, said pair of foot members being constructed of a resilient material.

12. The window shelf system as in claim 6 further comprising a pair of foot members connected to free ends of respective second arm elements of respective lower support arms, said pair of foot members being constructed of a resilient material.

13. The window shelf system as in claim 8 wherein:

each side wall of said pair of shelf mounting tracks defines a channel extending longitudinally between said top and bottom; and each leg member includes a pair of guide rails for slidable movement along corresponding channels of a respective shelf mounting track.

* * * * *